(12) United States Patent
Rampen et al.

(10) Patent No.: US 11,002,267 B2
(45) Date of Patent: May 11, 2021

(54) VALVE FOR FLUID WORKING MACHINE, FLUID WORKING MACHINE AND METHOD OF OPERATION

(71) Applicant: Artemis Intelligent Power Limited, Midlothian (GB)

(72) Inventors: William Rampen, Midlothian (GB); Niall Caldwell, Midlothian (GB); Stephen Laird, Midlothian (GB); Michael Fielding, Midlothian (GB); Peter McCurry, Midlothian (GB); Mark Brett, Midlothian (GB)

(73) Assignee: ARTEMIS INTELLIGENT POWER LIMITED, Midlothian (GB)

( * ) Notice: Subject to any disclaimer, the term of this patent is extended or adjusted under 35 U.S.C. 154(b) by 59 days.

(21) Appl. No.: 15/676,195

(22) Filed: Aug. 14, 2017

(65) Prior Publication Data

US 2018/0045196 A1 Feb. 15, 2018

(30) Foreign Application Priority Data

Aug. 12, 2016 (GB) ...................................... 1613901

(51) Int. Cl.
| | |
|---|---|
| *F04B 49/12* | (2006.01) |
| *F04B 49/22* | (2006.01) |
| *F04B 53/10* | (2006.01) |
| *F16K 37/00* | (2006.01) |
| *F16K 31/06* | (2006.01) |
| *F04B 7/00* | (2006.01) |
| *F04B 49/24* | (2006.01) |

(52) U.S. Cl.
CPC ............ *F04B 49/12* (2013.01); *F04B 7/0076* (2013.01); *F04B 49/22* (2013.01); *F04B 49/24* (2013.01); *F04B 53/1082* (2013.01); *F16K 31/0655* (2013.01); *F16K 37/0041* (2013.01)

(58) Field of Classification Search
CPC .. F04B 49/225; F04B 7/0076; F04B 53/1082; F04B 49/22; F04B 49/24; F04B 49/12; F04B 49/065; F04B 51/00; F04B 2201/08; F04B 2201/02; F16K 37/0041; F16K 31/0655; F16K 31/082; F01B 25/08
See application file for complete search history.

(56) References Cited

U.S. PATENT DOCUMENTS

| | | | |
|---|---|---|---|
| 5,422,919 A | 6/1995 | Graham | |
| 5,575,264 A | 11/1996 | Barron | |
| 6,337,635 B1 * | 1/2002 | Ericksen | .............. A01G 25/165 137/624.11 |
| 6,418,913 B1 | 7/2002 | Schmidt et al. | |
| 6,678,321 B1 | 1/2004 | Graham et al. | |
| 6,691,677 B2 * | 2/2004 | Eckerle | ................... F02D 41/00 123/357 |

(Continued)

FOREIGN PATENT DOCUMENTS

| | | |
|---|---|---|
| DE | 10117809 | 10/2002 |
| DE | 10117809 A1 | 10/2002 |

(Continued)

*Primary Examiner* — Eric Keasel
(74) *Attorney, Agent, or Firm* — Hauptman Ham, LLP

(57) ABSTRACT

A valve unit for a fluid working machine comprise a valve having a valve member (and optionally a valve seat), a valve actuator coupled to the valve member, and an electronic actuator controller which is integral to the valve unit and configured to actively control the valve actuator to thereby control the valve member.

19 Claims, 6 Drawing Sheets

(56) References Cited

U.S. PATENT DOCUMENTS

| | | | |
|---|---|---|---|
| 6,898,467 B1 | 5/2005 | Smith et al. | |
| 7,409,945 B2 * | 8/2008 | Remele | F02D 41/20 123/474 |
| 8,297,312 B2 * | 10/2012 | Tai | F16K 37/0041 137/624.16 |
| 8,381,760 B2 * | 2/2013 | Santinanavat | F16K 31/402 137/487.5 |
| 2001/0027813 A1 | 10/2001 | Endo et al. | |
| 2003/0154956 A1 | 8/2003 | Eckerle et al. | |
| 2004/0051069 A1 | 3/2004 | Miyazoe | |
| 2004/0089352 A1 | 5/2004 | Hayashi et al. | |
| 2006/0039795 A1 * | 2/2006 | Stein | F04B 7/0076 417/1 |
| 2006/0086088 A1 | 4/2006 | Pfaff | |
| 2008/0000453 A1 | 1/2008 | Remele et al. | |
| 2009/0307405 A1 | 12/2009 | Ottliczky | |
| 2012/0059524 A1 * | 3/2012 | Caldwell | F04B 49/22 700/282 |
| 2013/0213212 A1 * | 8/2013 | Stein | F04B 39/10 91/20 |
| 2014/0110613 A1 * | 4/2014 | Pitchford | F16K 31/082 251/129.01 |
| 2015/0047720 A1 * | 2/2015 | Tamba | F16K 37/0041 137/468 |

FOREIGN PATENT DOCUMENTS

| | | |
|---|---|---|
| DE | 10243699 A1 | 4/2004 |
| DE | 102010034752 | 2/2012 |
| EP | 0361927 | 4/1990 |
| EP | 0494236 | 7/1992 |
| EP | 0853366 A2 | 7/1998 |
| EP | 0868602 | 10/1998 |
| EP | 0868602 B1 | 9/1999 |
| EP | 1691067 | 8/2006 |
| EP | 1691067 A2 | 8/2006 |
| EP | 1719897 | 11/2006 |
| EP | 1719897 A1 | 11/2006 |
| EP | 2143114 B1 | 9/2011 |
| EP | 2 370 717 | 6/2013 |
| EP | 2143114 | 9/2017 |
| WO | 91/05163 | 4/1991 |
| WO | 97/23717 | 7/1997 |
| WO | 2007/088380 | 8/2007 |
| WO | 2009147490 A1 | 12/2009 |
| WO | 2011/104549 | 9/2011 |
| WO | WO 2011/104545 | 9/2011 |
| WO | WO 2013/114437 | 8/2013 |
| WO | 2015/040360 | 3/2015 |

* cited by examiner

PRIOR ART

VALVE FOR FLUID WORKING MACHINE, FLUID WORKING MACHINE AND METHOD OF OPERATION

FIELD OF THE INVENTION

The invention relates to the field of valves for regulating the flow of fluid between manifolds and working chambers of fluid working machines in which the displacement of each working chamber is selectable on each cycle of working chamber volume by the active control of valves, and also to fluid working machines incorporating such valves.

BACKGROUND TO THE INVENTION

It is known in the art to provide fluid working machines in which the flow of working fluid into and out of working chambers of cyclically varying volume (e.g. piston cylinder arrangement) is selected on each cycle of working chamber volume by actively controlling the opening or closing of at least one electronically controlled valve, to select the net displacement of working fluid by the working chamber on each cycle of working chamber volume.

This is known, for example, from EP 0361927 (Salter and Rampen) in which a low pressure valve (LPV) which regulates the flow of working fluid between a working chamber and a low pressure manifold is actively controlled to enable a pump to carry out either an active cycle or an inactive cycle. EP 0494236 (Salter and Rampen) developed this concept and introduced an actively controlled high pressure valve (HPV) which regulates the flow of working fluid between a working chamber and a high pressure manifold, enabling a motor to carry out either an active cycle or an inactive cycle and also enabling a fluid working machine to carry out either pumping or motoring cycles.

By active cycles we refer to cycles of working chamber volume which lead to a net displacement of working fluid from the low pressure manifold to the high pressure manifold, or vice versa. By inactive cycles, we refer to cycles of working chamber volume in which there is no net displacement of working fluid between the low and high pressure manifolds. Inactive cycles such as those described in EP 0361927 and EP 0494236 involve a working chamber receiving working fluid from the low pressure manifold and venting the same amount of working fluid back to the low pressure manifold, so that there is no net displacement of working fluid, although it is also known (e.g. from WO 2007/088380, Stein and Caldwell) to carry out an inactive cycle by keeping a working chamber sealed throughout a cycle of working chamber volume, from one minimum of working chamber volume until the next, so that there is no flow to or from any manifold.

In machines of this type, the LPV is actively controlled to select between active and inactive cycles, and in some embodiments to control the fraction of maximum stroke volume which is displaced during active cycles. In order to enable active control, each LPV is electronically controlled and has a valve actuator, typically a solenoid, which is coupled to a valve member. A solenoid may for example act on an armature which is coupled to the valve member (without necessarily being rigidly connected) through a valve stem. The HPV is also typically actively controlled in which case it also has an electronically controlled valve actuator, typically a solenoid, which is coupled to a valve member. However, in the case of a pump, the HPV can be operated in a solely passive way, for example, it may be a normally closed, pressure openable check valve.

By active control we include the possibility of a valve being actively opened, actively closed, actively held open or actively held closed. A valve may be biased open (normally open) or closed (normally closed). An actively controlled valve may also move passively in some circumstances, for example by flow forces or pressure difference rather than by the actuator force. For example, a LPV may be actively closed by the valve actuator but open passively when the pressure in a cylinder drops below the pressure in the low pressure manifold. Changes to the active control of a valve may for example include increasing the current through or voltage across solenoid, to open or close a valve, or to change the biasing of a valve member (e.g. to hold a valve member open or closed against a pressure differential which would otherwise close or open it).

In order to control the net displacement of a working chamber, the valve actuators of the respective LPV (and for motoring also the HPV) are actively controlled to regulate whether the valve members move (or are held open) during individual cycles of working chamber volume, and also when they move within the individual cycles. In particular, the valve actuators are controlled to determine whether each cycle is an active or inactive cycle. In some embodiments, the net displacement of active cycles is also selected on a cycle by cycle basis. The pattern of active and inactive cycles is selected so that the resulting displacement of the working chambers closely follows a target. The target displacement may change rapidly and as displacement decisions are made frequently, the actual displacement of the machine can vary very rapidly. Hence this type of machine can rapidly vary displacement and shaft torque, while operating in an energy efficient way. Examples of algorithms which can be employed to select active and inactive cycles to meet a target demand in this type of machine are, for example, disclosed in WO 2015/040360 (Caldwell et al.) and WO 2011/104549 (Rampen and Laird).

In machines of the prior art, a central machine controller transmits signals to each valve actuator to select between active and inactive cycles and to control valve opening. A central machine controller may need to change a current transmitted to a valve actuator several times during a cycle, for example, a current transmitted to a solenoid actuator might initially be zero, then increased to a predetermined value at a specific time during a cycle of working chamber volume (e.g. to actively close an LPV), then changed to being switched rapidly between a predetermined level and zero (pulse wave modulation) to reduce energy consumption (e.g. to hold an LPV closed may require less power than the initial step of closing the LPV) and then the current may be switched to zero again.

These arrangements can therefore lead to a high volume and complexity of wiring in a pump and/or motor and the present invention aims to address this. The volume and complexity of wiring would be further increased if sensors, with their required connecting wires, were added to the valves. The volume of wiring increases the weight of the complete assembly, and also increases the package space as well as presenting a technical challenge if valves are to be located close together. It can also be technically challenging to create (and repair) complex wiring looms.

Therefore the invention seeks to simplify and reduce the bulk of the wiring of valves in fluid working machines of this type.

An additional factor is that in my implementations, any solution must operate in 90+ degrees Celsius hot oil, and have sufficient mechanical strength to withstand oil flow forces and vibration.

It is known to integrate electronics into proportional flow valves which are valves which are configured to hold a valve member at a position intermediate open and closed and to regulate the extent of opening. However, such proportional flow valves are not relevant to machines of the type described above as they are designed to be held partially open and the valve members move too slowly.

SUMMARY OF THE INVENTION

According to a first aspect of the invention there is provided a valve unit comprising: a valve having a (first) valve member (and optionally a valve seat), a valve actuator coupled to the valve member, and an electronic actuator controller which is integral to the valve unit and configured to actively control the valve actuator to thereby control the valve member.

It may be that the actuator controller is configured to receive commands (e.g. from an external controller, e.g. a controller of a fluid working machine comprising the valve unit) and to determine (e.g. calculate and/or follow instructions as to) the timing of changes to the active control of the valve actuator taking into account the received commands.

The actuator controller may comprise a command interface and receive the commands through the command interface. The command interface may comprise an optical interface, for example at least one photosensor. The optical interface may be used in conjunction with at least one light source or photoemitter.

The said actuator controller may be configured to determine a valve actuator control sequence from the said commands, the actuator controller being configured to determine said timing of changes to the control of the valve actuator taking into account the determined valve actuator control sequence.

The actuator controller may be configured to receive data specifying one or more of the timing, duration or amplitude of active control of the valve actuator from one or more of the received commands. For example, the time at which a valve member should be held open or closed, or the start or end time, or duration of a period of time, for which the valve member should be held open and or closed.

It may be that the said actuator controller is configured to start a valve actuator control sequence responsive to one or more of the received commands (either immediately or after a delay, which may be predetermined, for example from a received command). Thus some of the received commands may be commands to carry out an active cycle. Typically, the actuator controller responds to such commands by actively controlling the actuator to cause a working chamber with which the valve unit is associated to carry out an active cycle (such that the valve member controls the flow of working fluid into the working chamber from a manifold and/or out of the working chamber into a manifold).

Thus, the machine controller may determine whether the working chamber with which the valve unit is associated carries out an active cycle of working chamber volume to carry out an active cycle (or an inactive cycle of working chamber volume) during an individual cycle of working chamber volume. The electronic actuator controller will typically determine the timing of changes to the actuator control to effect the active cycle responsive thereto.

It may be that the timing of the receipt of the command to carry out the active cycle determines the timing of subsequent changes to the active control of the actuator, for example the receipt of the command to carry out an active cycle may cause a valve actuator control sequence to begin immediately or after a predetermined period of time.

In such embodiments, a machine controller can thereby determine the phase of one or more valve openings or closings within a cycle of working chamber volume. However, the phase of one or more valve opening or closings may be determined by the actuator controller, with a received command determining whether or not the respective valve opening or closing occurs.

Thus some received commands may determine whether a valve actuator control sequence is carried out (typically to cause a working chamber with which the valve unit is associated to carry out an active cycle) and other received commands may determine properties (e.g. timing) of the valve actuator control sequence.

The commands are typically received from a machine controller.

It may be that the valve actuator is a solenoid and determining the timing of changes to the control of the valve actuator comprises changing the current through the solenoid (or voltage across the solenoid) at specific times.

It may be that changing the current through the solenoid comprises changing the mean current through the solenoid by changing modulation of the current through the solenoid (for example using pulse width modulation, e.g. varying the mark to space ratio of current pulses). It may be that changing the voltage across the solenoid comprises changing the mean voltage across the solenoid by changing modulation of the voltage across the solenoid (for example using pulse width modulation, e.g. varying the mark to space ratio of voltage pulses).

Typically, the valve actuator actuates the valve member to open the valve, close the valve, hold the valve open or hold the valve closed. It may be that the valve actuator sometimes leaves the valve member unbiased (and the valve member may move passively). The valve member may be a poppet valve and the valve unit may comprise a corresponding valve seat. The valve actuator is configured to move the valve member between an open position and a closed position, or vice versa, or to hold the valve member open or closed, and not to hold the valve member at an intermediate position between open and closed. The valve is not a proportional flow valve.

Actively holding the valve open or closed may involve energising the valve actuator (e.g. passing a current through a solenoid actuator).

The said actuator controller may comprise a memory storing one or more sequences of changes to the control of the valve actuator, the actuator controller being configured to select one of the said valve opening and/or closing sequences from the memory responsive to the received commands.

Typically, the memory will store at least a first sequence of changes for use during an idle cycle of a working chamber with which the valve unit is associated, and a second sequence of changes for use during an active cycle (i.e. a cycle of working chamber volume leading to a net displacement of working fluid) of a working chamber with which the valve unit is associated. Especially for an idle cycle, the stored sequence may in fact be null, such that the low pressure valve remains open. Thus an external controller may select between more than one sequence of changes to the control of the valve actuator. It may be that at least one sequence of changes comprises no change at all. The memory may store default instructions determining how the actuator controller should control the valve actuator by default, in the absence of a command. For example, this may be to control the valve actuator to hold the valve member in an open or closed position; where the valve actuator is a solenoid, this may be to regulate the current through the solenoid to a default value, which may be zero. The control of the valve actuator is typically active control (consuming energy) even if the valve actuator does not always move as a result (e.g. where the valve actuator is held in a position to keep the valve open or closed).

It may be that the received commands include a phase or frequency signal and wherein the actuator controller takes into account the phase or frequency signal when determining the timing of changes to the control of the valve actuator.

For example, the sequence of changes stored in the memory may specify the timing of changes with reference to a frequency or phase. The phase may be the phase of a working chamber with which the valve unit is associated and/or a rotatable shaft of a fluid working machine, wherein the cycles of volume of the working chamber are coupled to (possibly with a gearing ratio) rotations of the rotatable shaft of the fluid working machine.

The valve unit may further comprise a power line configured or configurable to deliver electrical power to the valve unit from a power supply, wherein the said actuator controller is configured to receive the said commands from the external controller through the power line.

Accordingly, the command interface may comprise an electronic circuit in communication with the power line and configured to decode (e.g. demodulate) command signals received through the power line.

The valve unit may comprise one or more sensors, wherein the actuator controller is configured to receive sensor measurements from the said one or more sensors to determine the said timing of changes to the control of the valve actuator taking into account the said received sensor measurements.

For example, a said sensor may be a temperature sensor. Temperature will affect the viscosity of working fluid and by taking measured temperature into account when determining the precise timing of changes to the control of the valve actuator, the time of opening or closing of the valve can be regulated despite variations in temperature. It may be that the valve actuator is a solenoid and a said sensor is a coil resistance or a back EMF sensor. One or more said sensors may be magnetic field sensors, valve member position sensors (e.g. poppet position sensors), accelerometers, current sensors etc.

Note that the timing of valve opening or closing is generally affected by the timing of changes to the control of the valve actuator but need not be coincident with changes to the control of the valve actuator. For example, there may be a delay between a change in control of the valve actuator and movement of a valve member, the valve member may not move until the pressure has changed appropriately within a working chamber with which the valve unit is associated, the valve member may open or close passively, e.g. as a result of changes in the pressure within a working chamber with which the valve unit is associated etc.

The valve unit may receive measurements of properties of the valve actuator and use that data to determine the said timing of changes to the control of the valve actuator. For example, where the valve actuator is a solenoid it is possible to determine from the current through the solenoid when the valve member moves and this may be used in a feedback loop to control the timing of changes to actuation signals in response to subsequent commands.

It may be that the valve unit comprises a data buffer configured to store sensor signals from one or more of the said sensors.

The actuator controller may be configured to cause the valve member to remain in an open position or in a closed position by applying a pulse width modulated signal to the valve actuator.

The actuator controller may be configured to determine a frequency and/or mark to space ratio of the pulse width modulated signal.

The actuator controller may further comprise a closed electrical current control loop configured to maintain a consistent actuating force to the valve actuator. By consistent we refer to being the same from one actuation to the next, within practical tolerances.

The actuator controller typically comprises a (analogue or digital) processor configured to determine the said timing of actuation of the valve actuator. The processor may comprise a microprocessor or a microcontroller (e.g. a Peripheral Interface Controller (PIC) microcontroller). The actuator controller typically comprises a (solid state) memory.

The actuating force may vary during actuation, and may not be continuous. However, it should preferably be consistent from one actuation to another, even when the conditions of resistance of the coil, supply voltage, and other such factors change.

Typically the actuator controller comprises one or more Field Effect Transistors (FETs), the FETs being provided between the processor and the valve actuator.

The valve unit may have a stored identifier of the valve unit (e.g. in memory) or be configured to generate or receive (e.g. through the communication interface) and then to store (e.g. in memory) an identifier of the valve unit, wherein the actuator controller is configured to receive commands comprising identifiers and to process the commands if the received commands comprise the stored identifier of the valve unit.

The commands may for example be commands that a valve unit should carry out a sequence (e.g. a stored sequence) of changes to the actuation of the valve actuator, or to modify or add a stored sequence of changes to the actuation of the valve actuator.

The valve unit may comprise one or more switches which are selectively actuatable to thereby assign the stored identifier of the valve unit.

It may be that the actuator controller is configured to respond to a command signal by pausing for a random period of time before carrying out a sequence of changes to the actuation of the valve actuator, where the command signal is indicative that this should take place. This may be useful to enable the location of the valve in the machine (e.g. which working chamber it is associated with), and/or the stored identifier of the valve, to be determined. Thus, if multiple valves were asked to carry out a sequence of changes to the actuation of the valve actuator, they would not all do so at once and so could be individually identified.

The actuator controller of the valve unit may be configured to transmit data (typically through the same communication interface) to a machine controller (typically the machine controller from which the commands are received).

The data may for example specify the status of the valve unit, or comprise stored data measured from one or more sensors.

The valve unit may comprise a second valve having a second valve member (and optionally a second valve seat), and a second valve actuator coupled to the second valve member, wherein the electronic actuator controller is also configured to actively control the second valve actuator to thereby control the second valve member.

The invention extends to apparatus comprising a first valve unit, being a said valve unit and a second valve unit, the second valve unit having a second valve member (and optionally a second valve seat), and a second valve actuator coupled to the second valve member, wherein the electronic actuator controller of the first valve unit is also configured to actively control the second valve actuator to thereby control the second valve member.

It may be that at least one wire extends from the first valve unit to the second valve actuator of the second valve unit. The first and second valve units typically regulate the flow of working fluid into or out of the same working chamber, through different manifolds (for example a low pressure manifold and a high pressure manifold).

According to a second aspect of the invention there is provided a fluid working machine comprising a rotatable shaft and a plurality of working chambers having working volumes which vary cyclically with rotation of the rotatable shaft, each working chamber having a valve unit comprising a low pressure valve which regulates the flow of working fluid between the working chamber and a low pressure manifold, and each working chamber having a high pressure valve which regulates the flow of working fluid between the working chamber and a high pressure manifold, each said valve unit further comprising a valve member, a valve actuator coupled to the valve member and an electronic actuator controller which is integral to the valve unit and configured to actively control the valve actuator to thereby control the valve member,
a machine controller configured (e.g. programmed) to determine, for each cycle of working chamber volume, whether the respective working chamber should carry out an active cycle in which the working chamber makes a net displacement of working fluid or an inactive cycle in which the working chamber makes no net displacement of working fluid and to transmit command signals to the electronic actuator controllers, wherein the actuator controllers receive the command signals and control the respective valve actuators responsive thereto to thereby determine the net displacement of working fluid by the working chambers.

It may be that the valve units are valve units according to the first aspect of the invention.

One or more command signals transmitted from the machine controller to the electronic actuator controllers may determine properties of valve actuator control sequences carried out by the valve actuators in response to commands from the machine controller to carry out an active cycle. The properties may for example comprise one or more of the timing, duration or amplitude of active control of the valve actuator from one or more of the received commands. For example, the time at which a valve member should be held open or closed, or the start or end time, or duration of a period of time, for which the valve member should be held open and or closed.

The valve units may further comprise the said high pressure valves.

The fluid working machine may comprise a sensor which measures the phase and/or frequency of rotation of the rotatable shaft and the machine controller transmits a phase and/or frequency signal to the actuator controllers of the valve units responsive thereto.

The machine controller may transmit command signals to the actuator controller of a valve unit at a time calculated taking into account the location of the respective valve unit (the position of the working chamber the flow of working fluid into and/or out of which is regulated by the valve unit). The machine controller takes into account the phase of the cycles of volume of the respective working chamber (the flow of working fluid into and/or out of which is regulated by the valve unit). Thus, in some embodiments, the command signals transmitted to the actuator controllers of the valve units are spaced apart in time taking into account the relative phase of the working chambers associated with the valve units (i.e. the working chambers the flow of working fluid into and/or out of which is regulated by the respective valve unit).

It may be that a power line extends between the machine controller and each said valve unit and wherein the command signals are transmitted from the machine controller to the actuator controller of the valve units through the power line.

The fluid working machine may be configured such that the valve units transmit data to the machine controller. The data may for example specify the status of the valve unit, or comprise stored data measured from one or more sensors.

The data may be an identifier of the valve unit. It may be that the machine controller is configured to transmit to the valve units identifiers of valve units which individual commands concern.

The machine controller and the actuator controller of the valve units may comprise synchronised clocks (for example, clocks which are synchronised periodically). The machine controller may be configured to transmit the time at which an event should occur (e.g. that a valve should open or close) to the actuator controller of one or more of the valve units. One or more valve units (typically the actuator controller of one or more valve units) may be configured to transmit to the machine controller data indicative of the time at which an event occurred, typically a valve opening or closing event. The data indicative of the time may comprise a time signal, a phase signal (relative to the phase of cycles of working chamber volume etc.) Said data may take the form of a time stamp. The machine controller may process the received data indicative of the time at which an event occurred in order to determine subsequent commands transmitted to the valve actuators and/or to determine a status or failure of a valve, and/or to determine calibration or instruction data for the said valve and to transmit the said calibration or instruction data to the said valve.

It may be that the fluid working machine comprises means to determine that a specific working chamber has undergone an active cycle and thereby to determine which valve unit is associated with the respective working chamber. For example, it may be that the machine controller is configured to command one or more valve units to cause their respective working chamber to undergo an active cycle, wherein the fluid working machine further comprises means to determine which working chamber carries out an active cycle as a result and thereby determine which working chamber a valve unit is associated with.

For example, a valve unit may monitor (e.g. the time or phase of) the opening or closing of a valve (typically the passive opening of a low pressure valve following the closing of a high pressure valve) and transmit a signal to the machine controller indicating that the opening or closing has occurred and/or the time or phase of the opening or closing. This signal can be compared with the expected signal for each working chamber in order to determine if the valve has been actuated at the respective correct time or phase. The machine controller may thereby identify which valve unit is associated with a respective working chamber.

The fluid working machine may further comprise a pressure sensor to measure the pressure of working fluid in the low pressure or high pressure manifold. It may be that the machine controller is configured to command valve units to cause their respective working chamber to undergo an active cycle of working chamber volume, to monitor the resulting pressure of working fluid using the pressure sensor and to thereby determine which valve unit is associated with which working chamber.

The invention extends in a third aspect to a method of operating a valve unit according to the first aspect of the invention, the method comprising the actuator controller receiving a command and, responsive thereto, carrying out one or more changes to the control of the valve actuator. The invention extends in a fourth aspect to a method of operating a fluid working machine according to the second aspect of the invention, the method comprising the machine controller transmitting a command which is received by the actuator controller of a valve unit and, responsive thereto, carrying out one or more changes to the control of the valve actuator.

It may be that as a result the working chamber associated with the valve unit carries out an active cycle of working chamber volume.

It may that as a result the actuator changes a valve actuator control sequence which is followed in response to subsequent commands to carry out an active cycle of working chamber volume. For example, some of the commands transmitted by the machine controller to the actuator controller may specify one or more of the timing, duration or amplitude of active control of the valve actuator from one or more of the received commands. For example, the time at which a valve member should be held open or closed, or the start or end time, or duration of a period of time, for which the valve member should be held open and or closed.

It may be that the value unit comprises at least one sensor and the timing of the changes to the control of the valve actuator is varied responsive to current or previous measurements by the at least one sensor.

It may be that the valve unit receives a phase or frequency signal related to the phase or frequency of cycles of working chamber volume and the valve actuator controller takes into account the phase or frequency signal when determining the timing of one or more changes to the control of the valve actuator.

It may be that the actuator controller further controls a second actuator of a second valve responsive to the received control signals.

It may be that the second valve is integral to the valve unit; or wherein the second valve is part of a second valve unit to which the valve actuator is connected (e.g. through a wire).

It may be that the machine controller transmits command signals to the controllers of the valve units to thereby control whether individual working chambers undergo active or inactive cycles of working chamber volume, and wherein the controllers of the valve units regulate the timing of valve opening or closing during the respective active cycles.

The step of transmitting command signals may comprise modulating the voltage or current of a power line extending to the valve units.

It may be that the command signals are transmitted wirelessly (for example by optical or radio communication).

It may be that at least one valve unit comprises at least one sensor and wherein the valve actuator of the valve unit varies the time of opening or closing of the valve relative to the timing of receipt of command signals, responsive to measurements by the at least one sensor.

The method typically comprises receiving a phase signal indicative of the phase of cycles of working chamber volume and controlling the timing of the control signals relative to the phases of cycles of working chamber volume with reference to the phase signal.

It may be that the low and/or high pressure valves are solenoid actuated face seating valves, e.g. poppet valve.

By the low pressure manifold and high pressure manifold we refer to the relative pressure of the manifolds. In a pump, the low pressure manifold is the manifold from which fluid is received and the high pressure manifold is the manifold to which fluid is pumped. In a motor, the high pressure manifold is the manifold from which pressurised fluid is received and the low pressure manifold is the manifold to which fluid is vented.

The machine controller typically comprises at least one processor (and possibly multiple processors) and at least one solid state computer readable medium, in electronic communication with the at least one processor, storing computer program instructions. However, the machine controller may be implemented in whole or in part as electronic circuits. The function of the machine controller may be distributed amongst a plurality of processors. The machine controller may have a target input through which an output target is received.

The machine controller may select the net displacement of the group of one or more of the working chambers to match a target. The target may be received through a target input and processed by the machine controller. The machine controller may calculate the target. The target may be calculated from a received demand signal, which is indicative of a required value of a parameter which is related to the net displacement of the group of one or more of the working chambers, for example a torque demand signal (which is proportional to both the net displacement and the pressure). The target is typically a target for the combined net displacement of the plurality of working chambers which make up the said group. The machine may have one or more further working chambers and may select the net displacement of a plurality of different groups of working chambers to each match a separate target. Working chambers may be reallocated from one group to another during operation. This is useful to enable the machine to service a plurality of separate sources or sinks of working fluid to meet a plurality of different working functions at the same time.

The fluid working machine may be a pump. The fluid working machine may be a motor. The fluid working machine may be a pump-motor which is operable as a pump or a motor in alternative operating modes. The fluid working machine may be pneumatic. The fluid working machine may be hydraulic.

The valve actuators may comprise solenoids. The low pressure and/or high pressure valves may comprise a magnetic pole piece, which is typically slidably mounted, and which is coupled to a valve member. The fluid working machine may comprise solenoid driver circuits which switch the current provided to the solenoid of the low pressure valves and/or the high pressure valves with a mark to space ratio which varies responsive to the primary actuation signals and/or additional actuator signals.

The low pressure valves and/or the high pressure valves may comprise a valve member and a biasing member, such as a spring, which biases the valve member and/or the valve actuator, so that the valve is by default open or by default closed.

The fluid working machine may comprise a phase sensor (such as a shaft encoder associated with the rotating shaft)

which generates a signal indicative of the phase of cycles of working chamber volume. The phase signal may be communicated to the actuator controllers. The actuator controllers may be configured to control the timing of the actuation signals relative to the phases of cycles of working chamber volume with reference to the phase signal.

Optional features disclosed in respect of any of the aspect of the invention are optional features of each aspect of the invention.

BRIEF DESCRIPTION OF THE DRAWINGS

An example embodiment of the invention will now be illustrated with reference to the following Figures.

DETAILED DESCRIPTION OF AN EXAMPLE EMBODIMENT

Figure 1:
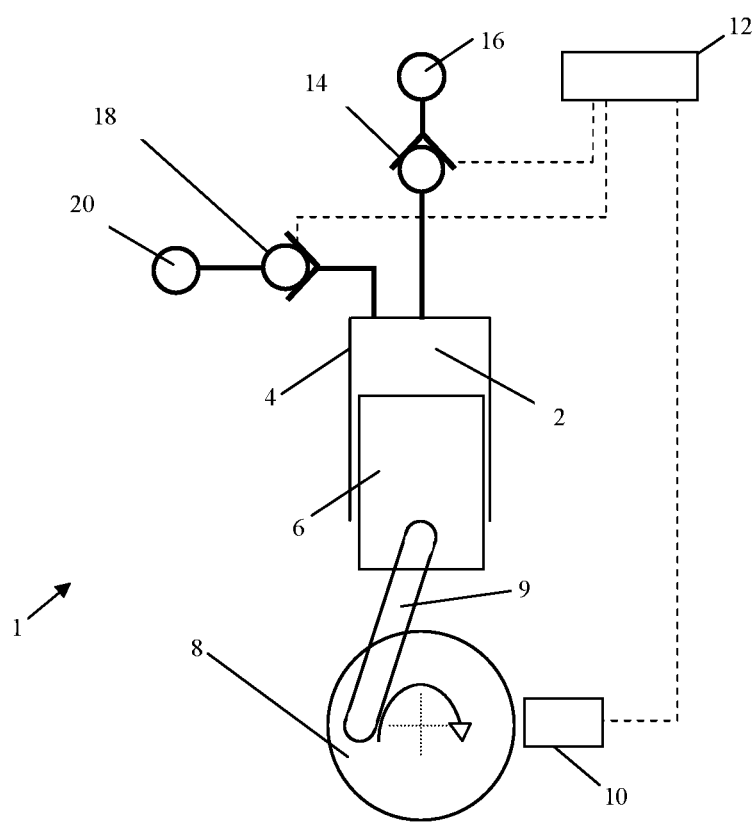
FIG. 1 is a schematic diagram of a prior art fluid working machine.

FIG. 1 is a schematic diagram of an individual working chamber 2 in a fluid-working machine 1, which typically comprises a plurality of corresponding working chambers. The fluid-working machine may be a pump, which carries out pumping cycles, or a motor which carries out motoring cycles, or a pump-motor which can operate as a pump or a motor in alternative operating modes and can thereby carry out pumping or motoring cycles. The net throughput of fluid is determined by the control of electronically controllable valves, in phased relationship to cycles of working chamber volume, to regulate fluid communication between individual working chambers of the machine and fluid manifolds. Individual chambers are selectable by a controller, on a cycle by cycle basis, to either undergo an active cycle in which they displace a predetermined fixed volume of fluid or to undergo an inactive cycle with no net displacement of fluid, thereby enabling the net throughput of the machine to be matched dynamically to a demand.

An individual working chamber 2 has a volume defined by the interior surface of a cylinder 4 and a piston 6, which is driven from a crankshaft 8 by a crank mechanism 9 and which reciprocates within the cylinder to cyclically vary the volume of the working chamber. A shaft position and speed sensor 10 determines the instantaneous angular position and speed of rotation of the shaft, and transmits shaft position and speed signals to a machine controller 12, which enables the machine controller to determine the instantaneous phase of the cycles of each individual working chamber. The controller typically comprises a microprocessor or microcontroller which executes a stored program in use.

The working chamber comprises an actively controlled low pressure valve in the form of an electronically controllable face-sealing poppet valve 14, which faces inwards toward the working chamber and is operable to selectively seal off a channel extending from the working chamber to a low pressure manifold 16. The working chamber further comprises a high pressure valve 18. The high pressure valve faces outwards from the working chamber and is operable to seal off a channel extending from the working chamber to a high pressure manifold 20.

Figure 2:
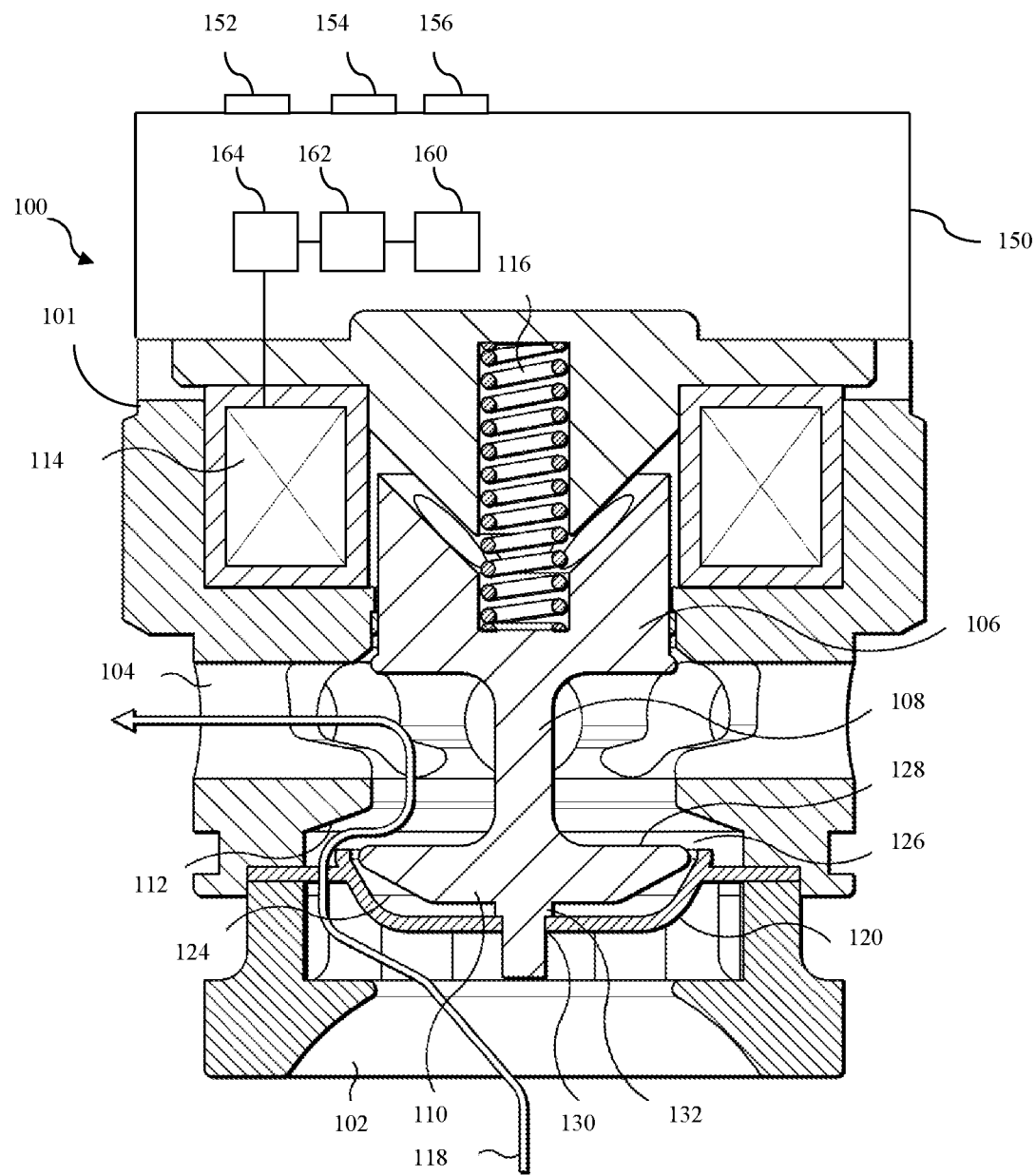
FIG. 2 is a cross section through an electronically controlled LPV.

A valve unit 100 comprising the LPV is shown in cross section in FIG. 2. The LPV has a valve body 101, a first port 102 in communication with a working chamber and a second port 104 which leads to the high pressure manifold through a plurality of radially extending apertures. If the machine is a pump, the first port is the inlet and the second port is the outlet and the net flow out of the working chamber is by path 118. In a motor, the first port is the outlet and the second port is the inlet and the flow of fluid is reversed. In a machine operable as either a pump or a motor the first and second ports can function as inlet or outlets depending on the direction of fluid flow.

The valve includes an armature 106 which is formed integrally with a valve stem 108 which connects the armature to a poppet valve head 110, functioning as the valve member. The armature and solenoid are part of a magnetic circuit conducted through the valve body. The poppet valve head is operable between the open position illustrated in FIG. 2 and a closed position in which is seals against a valve seat 112. A solenoid 114 can be used to close the valve under the active control of the actuator controller 162 (described below) and a return spring 116 is provided to bias the armature away from the electromagnet and therefore bias the poppet valve head to the open position. The solenoid and armature together function as the valve actuator. A barrier 120 on the working chamber side of the valve head, away from the valve seat, fixed to the valve assembly by radial connecting arms 122 between which fluid can flow. The barrier defines a chamber 124 which communicates with a constricted flow region 126 around the periphery of the valve member. When fluid flows out through the valve assembly, along the flow path 118, the pressure drops in the constricted flow region and therefore also in the reduced pressure chamber providing an opening force which counteracts forces on the poppet valve arising from the flow of working fluid along path 118. The valve stem extends beyond the poppet valve head, through an aperture 130 in the barrier and includes a flange 132 which cooperates with the periphery of the aperture to limit movement of the poppet valve head away from the valve seat so that there is always at least some fluid in the chamber between the barrier and the poppet valve head. This reduces the formation of squeeze film at this location which would provide additional resistance to closing, increasing the power consumption of the valve assembly and reducing the operating speed.

The HPV may be an electronically controlled valve with a solenoid acting on an armature coupled to a valve member, generally corresponding to the LPV, although for a dedicated pump it may be a simply spring loaded check valve, for example.

In the LPV shown, the armature, valve stem and valve member function as a travelling member which moves backwards and forwards to open and close the valve. Oil films form between the travelling member and the body of the valve, for example at the valve sealing line, but also between the armature and the body. In some embodiments, the travelling member comprises two or more parts which do not always move together, for example, the armature may bear on the valve stem to close the valve but able to move away from the valve stem under the control of the valve actuator, with the valve stem and valve member biased towards the armature by a spring.

The valve unit further comprises an integral valve control module 150, such as a printed circuit board fixedly attached to the body of the valve. The valve control module has a ground input 152, a positive potential power rail 154 and, in this example, a control input 156. The valve control module has a processor 162 which is in electronic communication with a solid state memory 160 which stores data, including program instructions which are executed by the processor in use, an identifier of the valve unit, and timing data indicating a time series of changes to the current through the actuator solenoid which should be carried out in response to specific commands received through the control input. The time series may specify changes in the current to take place a predetermined period of time after a command is received but in some embodiments the valve unit receives working chamber phase or frequency data during operation and the time series specifies changes in current with respect to one or more phase or frequency dependent parameters. A current 164 regulator, such as a FET, supplies current to the solenoid actuator, under the control of the processor 162.

During operation the machine controller determines on which cycles of working chamber volume the respective working chamber should carry out an active cycle (in which there is a net displacement of working fluid by the working chamber, from the low pressure manifold to the high pressure manifold in the case of pumping and from the high pressure manifold to the low pressure manifold in the case of motoring) or an inactive cycle in which there is no net displacement of working fluid (for example, in which the working chamber remains sealed from both manifolds or the low pressure valve remains open and the high pressure valve remains closed so the working fluid simply flows in and out of the working chamber with no net displacement).

Figure 3:
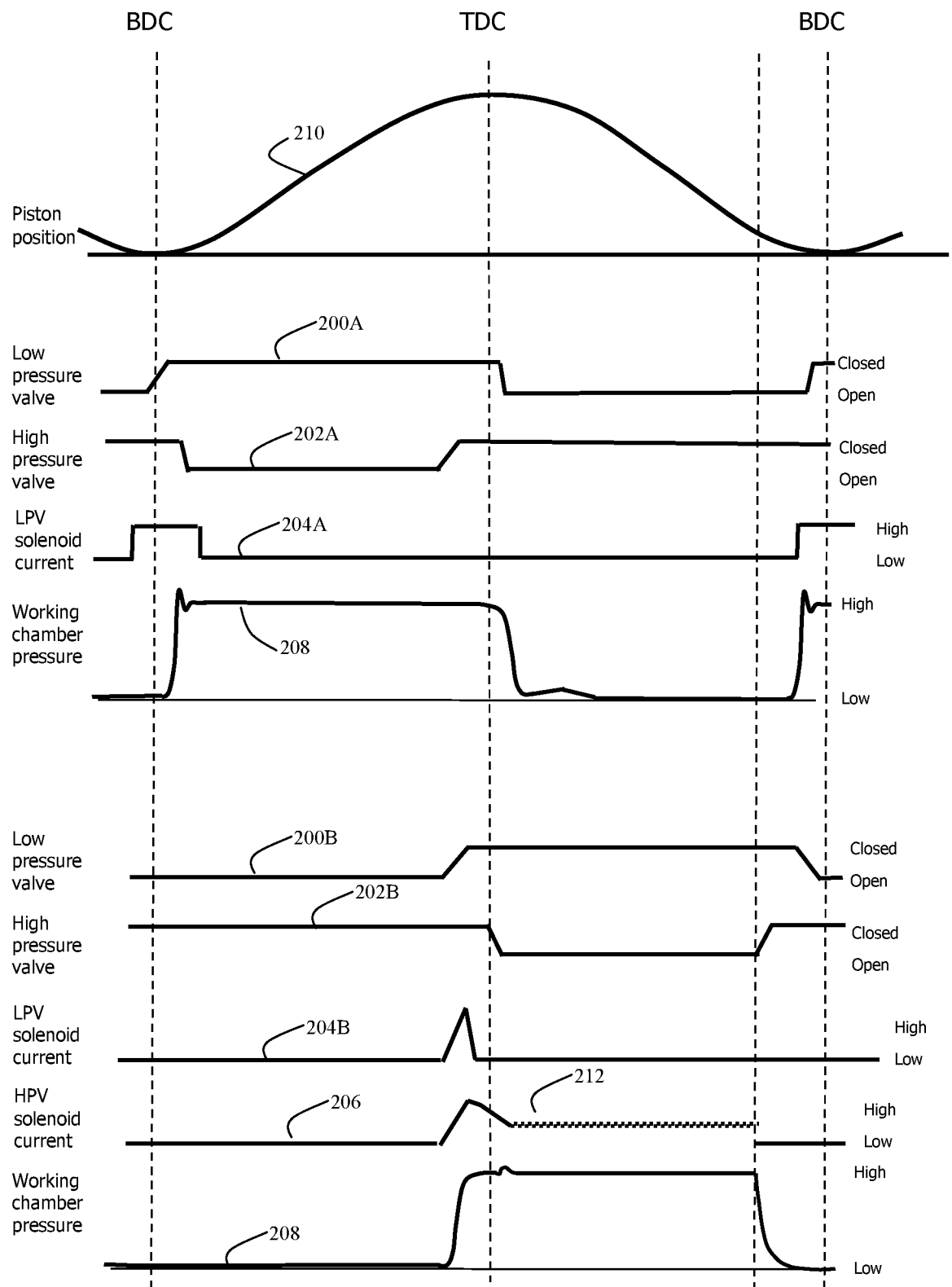
FIG. 3 is a schematic diagram of LPV position, HPV position, working chamber pressure and solenoid actuation signals for both pumping (upper traces) and motoring (lower traces) in fluid working machines.

In order to implement active pumping cycles, the LPV must be actively controlled, and for active motoring cycles, the LPV and HPV must both be actively controlled. FIG. 3 shows the details of a full stroke active pumping cycle (top) and motor cycle (bottom).

The figure shows the variation within time in LPV position 200A, HPV position 202A, LPV solenoid current 204A and working chamber pressure 208A (which is illustrated relative to the low pressure manifold pressure) during a pumping cycle, as well as the variation in LPV position 200B, HPV position 202B, the LPV solenoid current 204B, HPV solenoid current 206 and working chamber pressure 208B during a motoring cycle. The timing of events is shown relative to cycles of working chamber volume 210 between the point of maximum volume, bottom dead centre (BDC) and point of minimum volume, top dead centre (TDC).

A pumping cycle begins with the LPV and HPV closed. Shortly before BDC a current is passed through the LPV solenoid, as shown in the upper part of FIG. 3. As a result, a closing force is applied to the LPV valve member. The force exerted on the armature exceeds the biasing force from the LPV spring and the LPV opens. Pressure in the working chamber rises as the working chamber contracts whilst sealed and the HPV opens passively once the pressure differential between the working chamber and the high pressure manifold is sufficiently low that the net force urging the high pressure valve open exceeds the forces urging the HPV closed arising from the pressure differential across the HPV valve member. Working fluid is then displaced from the working chamber into the high pressure manifold.

The HPV closes passively when the piston reaches TDC and the working chamber begins to expand again. The LPV then opens during the expansion stroke once the pressure within the working chamber is sufficiently close to the low pressure manifold that the spring biasing the low pressure valve can overcome the force due to the pressure differential across the LPV valve member. During the subsequent expansion stoke, the LPV remains open and hydraulic fluid is received from the low pressure manifold.

At or around BDC, the actuator controller determines whether or not the LPV should be closed. If so, fluid within the working chamber is pressurized and pumped to the HPV during the subsequent contraction phase of working chamber volume, as before. However, if the LPV remains open, fluid within the working chamber is vented back to the low pressure manifold and an inactive cycle occurs, in which there is no net displacement of fluid to the high pressure manifold. In an inactive cycle, the low and high pressure valves will both remain inactive; the high pressure valve will remain closed and the low pressure valve will remain open (although it is also known to carry out in inactive cycle in which the low pressure valve remains closed).

In some embodiments, the LPV will be biased open and will need to be actively closed by the controller if a pumping cycle is selected. In other embodiments, the LPV will be biased closed and will need to be actively held open by the controller if an idle cycle is selected. The HPV may be actively controlled, for example an actuation signal may be used to provide additional force to urge it open or closed, although for the pumping cycle described above it is sufficient for the HPV to be a check valve.

With reference to the lower part of FIG. 3, in order to carry out a motoring cycle, both the LPV and HPV are actively controlled. During a contraction stroke, fluid is vented to the low pressure manifold through the low pressure valve. The low pressure valve is closed before top dead centre, causing pressure to build up within the working chamber as it continues to reduce in volume. Once sufficient pressure has been built up, a current is applied to the HPV solenoid so that the HPV opens, and fluid flows into the working chamber from the high pressure manifold. Once the HPV is open, the energy required to keep it open may be reduced and the mean current is reduced 212 using pulse width modulation. Shortly before bottom dead centre, the HPV is actively closed by the actuator controller, whereupon pressure within the working chamber falls, enabling the low pressure valve to open around or shortly after bottom dead centre.

In some embodiments, the low pressure valve will be biased open and will need to be actively closed by the actuator controller. In other embodiments, the low pressure valve will be biased closed and will need to be actively held open by the controller if an inactive cycle is selected. The low pressure valve typically opens passively, but it may open under active control to enable the timing of opening to be carefully controlled. Thus, the low pressure valve may be actively opened, or, if it has been actively held open this active holding open may be stopped. The high pressure valve may be actively opened (by the actuator controller) or passively opened.

In some embodiments, instead of selecting only between idle cycles and full stroke pumping and/or motoring cycles, the fluid-working controller is also operable to vary the precise phasing of valve timings to create partial stroke pumping and/or partial stroke motoring cycles. In a partial stroke pumping cycle, the low pressure valve is closed later in the exhaust stroke so that only a part of the maximum stroke volume of the working chamber is displaced into the high pressure manifold. Typically, closure of the low pressure valve is delayed until just before top dead centre. In a partial stroke motoring cycle, the high pressure valve is closed and the low pressure valve opened part way through the expansion stroke so that the volume of fluid received from the high pressure manifold and thus the net displacement of fluid is less than would otherwise be possible.

In operation, the fluid working machine controller decides, for each cycle of working chamber volume whether the respective working chamber should undergo an active or an inactive cycle (and in some embodiments what the net displacement of an active cycle should be). Suitable decision making algorithms are known to the person skilled in the art, for example from WO 2015/040360 (Caldwell et al.) or WO 2011/104549 (Rampen and Laird). The decision are made so that the total displacement follows that indicated by the target displacement, although actual displacement and target displacement need not perfectly match, for example, to avoid broken cylinders or the generation of unwanted frequencies.

Control signals are sent to the controllers of the individual valve units. When they receive instructions to carry out active cycles, they control the current through their solenoid actuators according to locally stored timing instructions to give the solenoid currents shown in FIG. 3.

These valve actuator control sequences (made up of a series of changes to the active control of the valve actuator, e.g. changes to the solenoid current) may be set, in whole or in part, by the machine controller by separate commands. For example, the machine controller may send commands specifying the duration at which the solenoid current should be at a maximum to hold a valve open or closed.

The timing valve actuator control sequences may be triggered by receipt of commands to carry out active cycles. The machine controller might determine both whether each working chamber should carry out an active cycle, and the exact phase at when it should start, and send appropriate signals to the respective valve actuators. The machine controller might determine how long a valve should be held open or closed in response to subsequent commands to carry out active cycles and transmit that information. However, in other embodiments, the machine controller determines whether each working chamber should carry out an active cycle during a particular cycle of working chamber volume but the actuator controller in the valve determines the timing (phase) within that cycle of all of the changes in the solenoid current. Some or all of that pattern of changes to the solenoid current might have been previously received from the machine controller.

There may be separate individual valve units for the HPV controlled in the same way. Individual valve units may comprise both an LPV and an HPV which regulate flow into and out of the same working chamber (through the LP and HP manifolds respectively), in which case the same control module controls the valve actuators of both valves.

Figure 4:
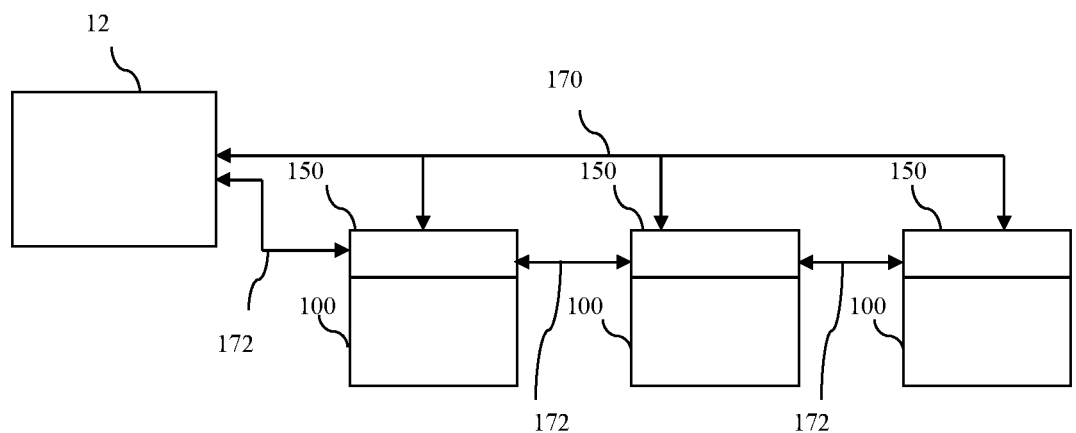
FIG. 4 is a schematic diagram of a fluid working machine in which the machine controller communicates with valve units through a dedicated communication bus.
Figure 5:
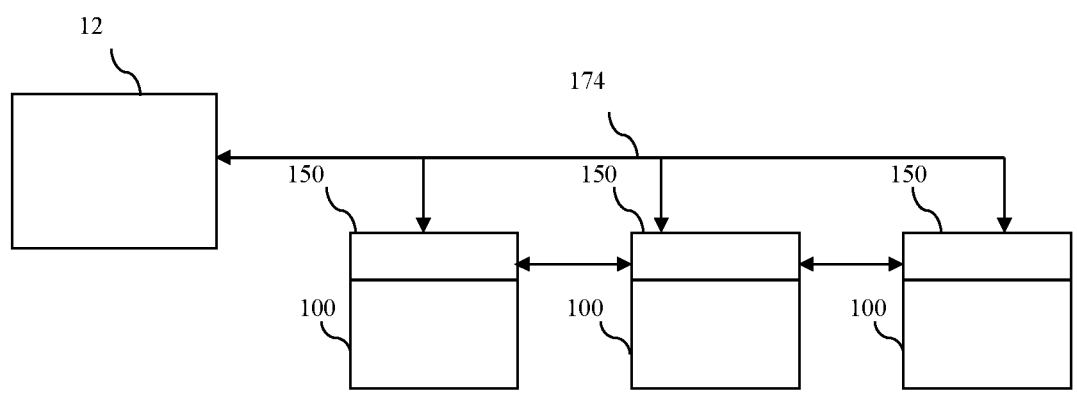
FIG. 5 is a schematic diagram of a fluid working machine in which the machine controller communications with valve units thorough the power bus.

With reference to FIG. 4, in some embodiments, the machine controller 12 communicates with the controllers 150 of individual valve units 100 through a communication bus 170 which extends to each valve unit and there is a separate power line 170. In other embodiments, with reference to FIG. 5, the machine controller 12 communicates with the controllers 150 of individual value units 100 through wires which also function as the power line 174, for example by modulating the voltage of the power line to transmit digital control signals.

Accordingly, electronics drivers 160, 162, 164 have been put on each solenoid coil of the fluid working machine and these are controlled remotely by the machine controller via a serial connection or via the power lines.

Each valve unit has an actuator controller, e.g. in the form of a microchip, mounted thereon. Each valve has a temperature sensor, a PIC processor, and flywheel diodes. In an example valve which has two LPV coils, the board on the valve may house at least three FETS, where two FETS are dedicated to firing the two coils of the LPV, and the third FET actuates the accompanying HPV.

In prior art machine, the machine controller determined:
a) the pattern of valve firing (i.e. at a decision point, choosing to pump, to motor, or to idle), and also
b) the precise nature of electrical signal to carry out the pump, or motor, or idle cycle. A pump cycle for example, requires closing the low pressure valve at a point in time/angle before the bottom dead centre, and then opening (or allowing to open) the high pressure valve as the piston moves from bottom dead centre towards top dead centre, as described above with reference to FIG. 3. The timing of closing the low pressure valve is critical to proper control and operation of the machine.

In an example according to the present invention, the main controller retains responsibility for the valve firing (a) (and patterns thereof), but step (b) (e.g. switching on and off current to the solenoid, performing PWM), is regulated by the actuator controller mounted to (e.g. on or in) the respective valve unit. As the actuator controller may be mounted to the valve unit, thus such electronic actuator controller is integral to and may be integrated with the valve unit.

Figure 6:
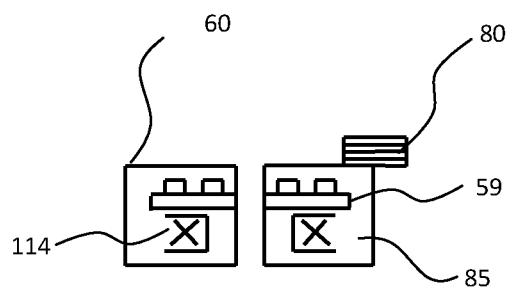
FIG. 6 is a cross section through an embodiment in which the valve solenoid and a PCB are potted.

FIG. 6 shows a cross section through an embodiment which the valve solenoid 114 and mounting PCB 60 potted in potting compound 85, and the electrical interface 80 (including connectors 152, 154, 156) protrudes from one face, from one side of that face. This figure is mainly shown to illustrate potting, and as such the board might not be present in which case the electronic components would be held and secured by the potting, rather than by reference to a board.

Figure 7:
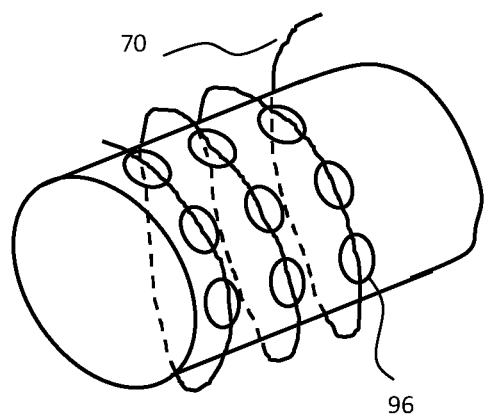
FIG. 7 shows a spiral cable connecting to a series of valve units.

FIG. 7 shows a spiral cable 70 aligning, for connection, to a series of valve units 100 arranged around a hydraulic machine in a spiral type arrangement.

Figure 8:
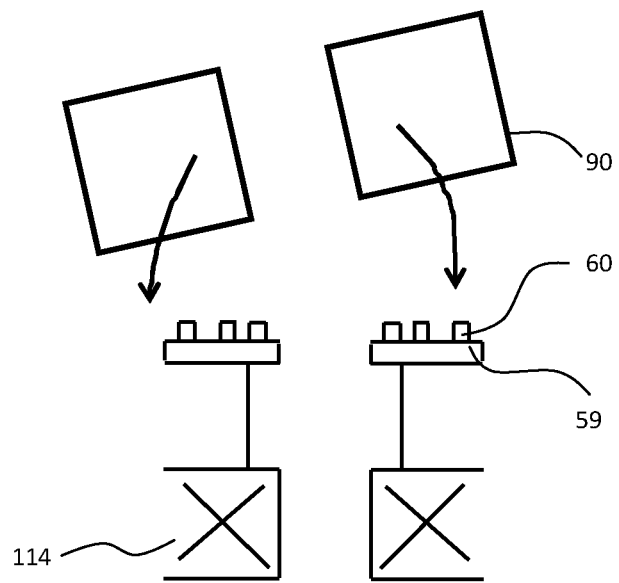
FIG. 8 shows an exploded cross section showing formation of a value unit using a push fit cap.

FIG. 8 shows a cross section through a PCB 60 mounted to a solenoid 114, and the assembly of the cap 90 is via a push fit onto the coil, over the board and chip, to protect them and to form a valve unit.

Figure 9:
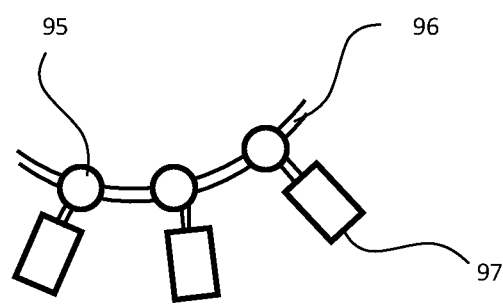
FIG. 9 shows a wiring loom connected to intelligent valve units which drive solenoid actuators of second valve units 97.

FIG. 9 shows a wiring loom connected to intelligent valve units 95, which correspond to valve units 100 described herein but which drive solenoid actuators of second valve units 97.

The invention provides electronics integrated into one or more of these valves, such valve or valves being referred to as intelligent valve units. 'Intelligent' is used to imply that some local processing takes place on the valve unit. More precisely, the local processing takes place in an actuator controller that is secured to a board which is in turn secured to the respective valve to form a valve unit.

The invention involves the master controller providing high-level commands to the actuator controller (e.g. PIC microcontroller) by a serial interface, each intelligent valve unit having a unique address. On power-up, each intelligent valve may be loaded with timing parameters from the master controller via a serial link (e.g. pulse length, PWM % (Pulse Wave Modulation' %)). During operation of the machine, the master controller can send serial commands to trigger each intelligent valve unit. After each trigger command, the intelligent valve unit executes the pre-programmed sequence of pulses by local control. It may be possible to define a serial communication protocol to allow triggering of each valve unit and to program the intelligent valve units with timing parameters.

Each pre-programmed sequence of pulses is a series of valve firing commands. This includes holding a valve using a varying/variable voltage/current level, e.g. using PWM. These pulses are relatively time sensitive, and accept only very minor delays before there is an impact on machine operation. One such pulse is delatching (turning off power) of the HPV so that it can open. This is a sort of valve firing (or stopping firing) event. Similarly there is a latching event, to close the HPV.

This may be a daisy-chain of connections from valve to valve, connecting them all onto a common serial command bus. There may also be provided a common positive and negative DC power supply to each valve as shown in FIG. 4.

Instead of each valve (LPV or HPV) being of the intelligent type, this may be rationalised to reduce the cost and number of boards and electronic components. As every LPV goes with a matching HPV, it is possible to make the LPV 'intelligent' and the HPV a 'slave'. The result is one intelligent valve per working cylinder (the LPV) which controls both the LPV coils and the HPV coil.

One embodiment might have 7 FETs, and could control a total of 3 coils for one working cylinder (2 coils for the LPV and 1 coil for the HPV). Such design would require large spade connectors for the common DC power bus (+48V DC, ground) and for the connection to the HPV coil (+, -). Two smaller connectors would be for the serial command bus. Also mounted on the PCB might be, for example, a 20 pin PIC microcontroller which decodes the serial commands according to its address, and sends gate signals to the FETs.

As described above, the master controller can send serial commands to trigger each intelligent valve unit. In this example, it is the master controller which receives the phase and/or frequency signal, which carries out the determination of timing. The master controller thus sends a simple 'time to fire' command to the actuator controllers. In this instance, the parameters are stored locally on the valve controller. In one embodiment, multiple parameter sets are stored on each actuator controller, and the master controller tells the actuator controllers which parameter set to use. It may be that each set corresponds to a different PWM pattern of differing frequency and/or amplitude with which to drive the actuator connected to the respective actuator controller, and/or duration of pulse.

The sequence of operation may be as follows:
1) The encoder sends a shaft position signal to the master controller, from which rotational speed or frequency can be derived.
2) A system demand is received by the master controller, providing a required output of the machine.
3) The master controller sends a trigger to the respective actuator controller in order to actuate the valve (typically the low pressure valve). The master controller sends a signal which comprises an address (identifying a valve actuator, or an actuator controller), such that the signal identifies the valve and/or working chamber to which it relates. With the address signal, the master controller also sends the command. The command may comprise such instruction as 'fire', which is to actuate the valve actuator, or such instruction as 'stop', which is to terminate the existing actuation of a particular valve actuator (equivalent to stopping 'fire' instruction).
4) There are multiple parameter sets stored on the respective actuator controller, which may be dynamically updated by the master controller. The parameter sets can be indexed, and an index variable can be used to inform the actuator controller of which of the parameter sets to use at any one time. The index variable may for example be the speed of the shaft as observed by the main controller and communicated to the actuator controller, resulting in the actuator controller switching from one parameter set to another as the shaft speed changes. Interpolation may performed by the actuator controller when the index variable is between the values associated with discrete parameter sets. The index variable may be broadcast by the master controller to all actuator controllers, or to subgroups of the actuator controllers depending on the configuration of the machine. For instance, the index variable may consist of the outlet pressure of the pump, and the actuator controller may interpolate between a number of different parameter sets, depending on the outlet pressure (index variable) associated with the actuator controller. Maybe one group of working chambers is connected to one fluid outlet at one pressure, another to another, and thus the index variable may be different for some groups of the actuator controllers. The master controller tells the actuator controller which parameter set to use, then, either:

The actuator controller detects motion of the valve, possibly by measuring the current, and sends a message to the master controller instantaneously, or The paired synchronised clock of the master controller and the clocks of the actuator controllers, provide a machine-wide synchronised time, which is a time reference common between the master and the actuator controllers. Synchronisation may be performed periodically according to a fixed time schedule, or according to a trigger event (e.g. if a significant time disparity is detected between master time and time on one actuator controller, thus synchronisation of all actuator controller clocks could be performed. The actuator controllers provide a 'local' timestamp on a feedback signal sent from the actuator controller to the master controller. Such a signal may be the timing associated with the opening of the low pressure valve (which induces a current/voltage in the solenoid, when the valve actuator is caused to move by the force balance on the valve member). The actuator controller detects the motion of the valve member by observing the current and or voltage of the corresponding solenoid coil. The time of detection is recorded by the actuator controller and transmitted to the master controller. A detected value, at the time of motion detection, may also be transmitted such as a signal corresponding to the velocity of the valve. A timestamp is associated with the detected valve signal. This timestamped signal may then be transmitted to the master controller for control purposes. Thus, the master controller is informed of the time, and possibly valve member velocity, at each valve opening event. This information may be used to detect failure of valves, to calibrate the motion of the valve for subsequent actions such that the expected valve motion may be compensated for more accurately, or may be used to infer another variable of the system which is otherwise difficult to measure.

Other variants and concepts are possible, for example an LPV using two coils, such valve unit may have two separate electrical connections for each LPV. The corresponding PCB would be a sort of 'semi-intelligent valve' which only connects with + and − connections to a central FET board, but which generated one of the two coil signals locally. In this case the PIC would not decode serial commands, but start to work as soon as power was applied to the terminals and simply delayed the action of one coil versus the other.

In some embodiments, instead of synchronising a clock, the master controller and actuator controllers receive corresponding phase signals (relating to the phase of the working chambers) and pass corresponding time information with reference to phase, for example, the machine controller may specify the phase of opening (and thereby to the time of opening). The timestamped signal may refer to the phase of the detected valve signal (and thereby to the time of opening).

In some embodiment, the commands are transmitted by high-frequency modulation on the DC power bus (power line communication). In this way, each valve unit would only have two connections (+ and −) but would listen to commands which were to be modulated at high frequency (>1 MHz) onto the DC bus power lines.

Ultimately each valve unit could be assembled into each hydraulic machine without the need to program each valve to know its position in the machine. Position determination could happen automatically during the end-of-line test, by trying out each possible address and seeing which one caused current to be taken, and how much flow was generated depending on shaft angle phase. So each valve could be manufactured with a unique address (like a GUID=globally unique identifier, or physical address) and would respond to a 'ping' request sent by the controller. Once it knew the addresses of each of the valves, the controller would determine the shaft angle of BDC (Bottom Dead Centre') of each valve by experiment, then the controller would know where each valve was located.

It is a challenge for the electronic components to operate reliably in hot oil. Machines with 'wet coils' are continuously immersed in the working fluid of the machine. The PCBs can be sealed somehow from the fluid, for example, with a silicone coat or layer, to help withstand this challenging environment.

In theory, the serial Command Bus is independent of the Power Bus. However, in practice the Power Bus is very electrically noisy, because each intelligent valve unit is taking current in PWM (typically at 10 kHz). These PWM pulses cause electrical noise on the DC power bus, which is coupled to the Command Bus by capacitive and inductive effects. This can lead to errors on the Serial Bus, which in turn may cause mis-operation of the valves.

The merit of the current design of a single central FET board, is that one can completely trust that each FET will fire exactly when commanded to do so. However, with intelligent valves, it may be difficult to determine that a particular valve has fired at the right time or not. Once the machine is assembled, it is not possible to measure the current taken by each valve, and thus it is not possible to verify its behaviour. Therefore troubleshooting is difficult, making it difficult to track down which valve is responsible. Some embodiments employ a bi-directional data bus, and at the time also use a single-direction bus, so the intelligent valves could provide feedback or checksum to the machine controller.

In an example in which the communication signals are transmitted over the power wire using high-frequency signal modulation, this greatly reduces the wiring internally within the pump.

In some embodiments, the installation of the valves is such that the machine controller could identify which valve is located at particular locations in valve cavities in the pump body—assuming a random installation of new valves. In some embodiments each valve has its own unique identity or identifier—like a like a GUID (Globally Unique Identifier'), or physical address—and on initialisation the machine controller triggers it to cause the respective working chamber to pump at various positions of the rotatable shaft. With the feedback from a pressure transducer, the approximate amount of fluid pumped could be inferred in response to each timing point. The controller can then associate each valve like a GUID=globally unique identifier, or physical address with a physical order in the pump. Following the determination of valve order, the automatic calibration process continues in order to optimise valve timing. Instead of optimising and calibrating the valve timing for each valve (different valves would optimally be controlled slightly differently, as due to manufacturing differences, they react slightly differently), it is possible that each valve would be controlled with a standard waveform, each intelligent actuator controller/processor having a copy of such standard matching waveform. As such, the intelligent actuator controller is configured to receive a 'command to fire', which then causes the respective actuator controller/processor to go through a sequence to modulate the valve drive signal.

In another approach (Random Tickle'), a production line for machines with intelligent valves (one-way communication) places unidentified valve units in machine, the valve units being unidentified in the sense that insertion of a valve into a valve cavity in a machine is not accompanied by the recording of the identity of the inserted valve. The machine controller issues a command to the actuator controllers that the inserted valves wait a random time before firing. When the valve fires, at its random moment in time, the controller assigns the valve an identifier. This is done until all valves have been assigned an identifier. Then, during automatic tuning, the machine controller identifies the positions of each of the identified valves in the block of the machine.

Address Options

Each valve should be individually commanded by the central/main controller, and so a unique address mechanism is needed. Some options for this are:

- A selector switch on the valve in/on which a unique identity switch position can be selected (e.g. a dip switch, or a rotary switch etc)
- A GUID (Globally Unique Identifier') or UUID (Universally Unique Identifier'), or physical address+auto detect.
- Coding the wiring loom, so the connector tells the valve, particularly the valve actuator, what its identity is (defined/keyed) (position programmed).
- The cavity tells the valve what its identity is, perhaps the edge of the cavity has a relief which when contacted by the valve (when it is installed), presents a unique shape, possibly comprising a number of contacts, which when they come into contact with the valve, provide a unique electric circuit, thus providing position information.

Ordering the wiring loom, using a daisy-chained communication bus or a token ring topology enables commands to be directed to specific valve units. The loom according to a token ring forms a control ring, and there may be an additional associated power ring.

The valve units may be automatically addressed according to the order in which they are positioned in the wiring loom. Each valve, particularly the valve actuator, may automatically detect its position in a chain, through means of passing a token down a daisy-chain of valves.

Command Physical Layer

This is the hardware (interface) between the machine controller and the intelligent valve units, to allow communication. Possible embodiments of this hardware are:

Acoustic-signaling hardware (i.e. acoustic signals may be sent, provided by a loudspeaker, to acoustic transducers in each valve unit instead of using wired communication buses). The acoustic medium might be oil, or air.

Three-wire connection (e.g. SPI (Serial Peripheral Interface bus))

Two-wire connection (e.g. RS485, bidirectional)

Four-wire connection (e.g. Ethernet)

Power-line communication (uses power lines as transmission media). DC powerline communication, e.g.:

Fixed carrier frequency+FM

Fixed carrier frequency+AM

Light in oil, which may use visible or non-visible light. E.g. make valve operation light-driven (control trigger), shine light into the dark cavity of oil. Communication could be one or two way, with light emitting components (light emitter or transmitter, or photoemitter) and light detecting components (light receiver, or photosensor), possibly having one light detecting component in each valve unit. In order to reduce diffusion of the signal as the light passes through the medium, another option is light in a light pipe (e.g. optical cable).

Radio interface, which could be one or two way, with radio signal emitting components (radio transmitter) and radio detecting components (radio receiver), possibly having a light detecting component in each valve unit.

Power Physical Layer

This is the hardware between the main source of electrical power and each valve, to provide the energy needed for actuation, and for the intelligent controller. Example embodiments include:

A positive and a return wire, with which each of the valves is connected in parallel.

A single positive connection, which is a bus, into which each of the valves taps into. Perhaps, this is done mechanically on insertion of the valve, so that it automatically makes contact with this bus. The return connection, ground, could be the body of the machine.

The positive could be unregulated, drawn directly from the battery, or it could be regulated to a fixed voltage, which could be either higher or lower (or negative) than the normal battery voltage, or a regulated voltage that is variable in operation depending on the condition, e.g. related to temperature or speed, in order to regulate the action of the valves.

A negative rail could be added, giving a three rail supply (or two rails and body), for wiring schemes such as H-bridges.

The coil current can be controlled by transistors (e.g. MOSFETs ('metal-oxide-semiconductor field-effect transistor')), which are located locally to the intelligent valve. The input signal is supplied by the actuator controller, or local microcontroller. The transistors could be arranged in a high-side drive, or low-side drive, or in an H-Bridge configuration. The control of currents, when it is desired to switch the valve off, the current may be reduced quickly, by an additional circuit to absorb the inductive energy of the coil in the breakdown of the transistors, or by recovering the inductive energy into one of the supply rails. Typically the valves will be controlled by a sequence of pulses, which will typically be an initial pulse (relatively long), followed by a PWM modulated duty cycle during the holding time/transit time of the valve. The valve may be controlled to reach a certain current and thereby the intelligent valve automatically regulates the PWM to hold the current at a certain level. The circuit in the intelligent valve may also act to sense the valve motion, by back EMF, or by inductance changes, and communicate that information back to the master controller.

Local Control Functions

The intelligent valve unit may be able to perform certain control functions locally within the actuator controller, rather than just receive a command from the machine controller. Such local functions may include:

Running through a pre-defined pulse sequence to drive the valve actuator with a suitable current/voltage waveform.

Fast turn off to switch off the valve current rapidly after a pre-defined time or at a particular current level.

Control of multiple coils in a single intelligent valve unit, to be actuated in a certain phased sequence after a command from the central controller. The coils may alternatively be activated independently with specific commands for each coil.

Closed-loop control of current to provide a consistent actuating force despite changing coil resistance, supply voltage etc. Current measurement could use a shunt resistor or a Hall effect sensor. Alternatively a Hall effect sensor may be located in/near the magnetic circuit of the valve actuator so that the actuation flux can be measured for closed-loop flux control.

Monitoring of local sensors (e.g. monitoring a pressure sensor that senses the pressure of the respective working chamber, position sensor on an actuator, etc.).

Communication of feedback of data from the intelligent valve (e.g. status data of the intelligent valve to the central controller). The intelligent valve may wait for a quiet period, storing the feedback data in a data buffer in memory corresponding to the actuator controller, until the quiet period during which the data may be communicated to the central controller.

Pulse width modulation to control the current in the valve actuator. The frequency used for the PWM may be defined by a local clock signal in the intelligent valve or alternatively may be coordinated by the machine controller (over the command bus) so that all intelligent valves use synchronised PWM at the same frequency. The phase of each intelligent valve's PWM may be defined/adjusted so that the intelligent valves draw power from the supply at different times. The frequency of PWM used by intelligent valves may be chosen to be different to reduce variation in current drawn from the supply.

The machine controller may transmit the shaft position to the intelligent actuator controller which may use this to decide when to activate the valve, taking into account other parameters and data.

Feedback (Sample Parameters)

The intelligent valve may have sensors attached to measure valve operating conditions. The information from these sensors may be reported back to the central controller. Items that might be sensed by the intelligent valve sensor(s) include:

- Coil temperature (e.g. measured with a temperature sensor located locally to the respective coil, or inferred from other sensor readings or inputs).
- Coil resistance (e.g. measured within the actuator controller electrically connected to the respective coil, where the controller has a resistance measuring or resistance inferring capability).
- Magnetic Field (flux) (e.g. measured with a magnetic field measuring device like a gaussmeter, or similar device, located locally to the respective coil, or a magnetic field inferring capability).
- Back EMF (can be used to detect poppet motion) (e.g. measured within the actuator controller electrically connected to the respective coil, where the controller has a EMF measuring capability, or a EMF inferring capability).
- Poppet position (e.g. measured using a position sensor located locally to the poppet, or a simply switch on an end stop, or inferred from another sensor reading or input)
- Acceleration (e.g. measured using an accelerometer on a travelling member which may travel with the poppet, or inferred from another sensor reading or input).
- Current (can be used to detect poppet motion) (e.g. measured within the actuator controller electrically connected to the respective coil, where the controller has a current measuring capability, or inferred from another sensor reading or input).

The above feedback items could be:

- Read directly by the central controller when requested
- Locally sampled and buffered (i.e. the item could be sampled by the actuator controller, for example using a sensor corresponding to the particular item, and the sensor connected to and/or communicating with the actuator controller, and the data from the sample stored in a data buffer, particularly digital memory corresponding to the actuator controller)
- Locally processed to produce a derived result (i.e. the coil resistance could be processed within the actuator controller, and a valve opening or closing event could be derived from this)
- Continuously monitored locally (i.e. the item could be monitored by the actuator controller)
- Monitored to determine a 'healthy' diagnosis. The current in the coil can be used to determine when the valve moves. The character of the current (for instance a peak current above or below a normal level) can indicate whether a valve is "healthy" or "unhealthy". This indication can be fed to the machine controller to form the basis of health diagnostics for the valve or the working chamber, or for the fluid working machine.

Calibration

The valve unit actuator controllers may be programmed with calibration data relating to respective specific valves, such as timing parameters for the actuation signal. These values (the calibration data) may be stored either in flash memory located either on the intelligent actuator controller, or the central controller which is communicated to the intelligent actuator controller after power-up. The calibration values may be updated on certain events, such as when the shaft speed changes.

Updates of Firmware or Parameters

The intelligent actuator controller may be reprogrammed in the field so that the valve behaviour or parameters can be changed. This may involve changing the operating software and parameters on the flash memory.

Physical Package of the Board—i.e. What is the Board, and how is it Mounted?

The board could be a PCB ('Printed Circuit Board'), or a custom ASIC ('Application-specific integrated circuit'), or the actuator controller and related electrical and electronic components could be located in potting compound. The electronic components may be immersed in oil, or may be in air, or may be surrounded by some other medium such as a potting compound or conformal coating.

Options for configuration and mounting of the intelligent actuator controller include:

- PCB mounted onto the coil of the valve unit
- Potted with coil of the valve unit. See FIG. 3.
- Conformal coating of a PCB to protect its components from oil/contamination
- Heatsink provided to dissipate heat in the actuator control, to ambient air, or to oil, or to the body of the machine (e.g. the cast body of the hydraulic machine acting as a large thermal mass)
- Sprung terminals from coil, which are 'capped' by the PCB.
- Wire connection to 'slave valves' (referred to as 'dumb valve' below)
- 'Intelligent wiring loom', with intelligent valve nodes connected to but not necessarily mounted on each dumb valve. See FIG. 6. The valve nodes themselves contain the intelligent actuator controller, instead of it being mounted on a board on the respective valve. By a dumb valve, we refer here to a valve unit which has a valve member (such as a poppet valve) and typically also a valve seat (such as a poppet valve seat) and a valve actuator (such as a solenoid) but which does not have the electronic components to control the timing of actuation of the valve actuator described above in respect of the intelligent valve unit.

What is claimed is:

1. A fluid working machine comprising
a rotatable shaft and a plurality of working chambers having working volumes which vary cyclically with rotation of the rotatable shaft, each working chamber having a valve unit comprising a low pressure valve which regulates the flow of working fluid between the working chamber and a low pressure manifold, and each working chamber having a high pressure valve which regulates the flow of working fluid between the working chamber and a high pressure manifold, wherein each valve unit of the corresponding working chamber includes a valve having a valve member, a valve actuator coupled to the valve member, and an electronic actuator controller which is integral to the valve unit and configured to actively control the valve actuator to thereby control the valve member, and the actuator controller is configured to receive commands and to determine the timing of changes to the active control of the valve actuator taking into account the received commands; and
a machine controller configured to determine, for each cycle of working chamber volume, whether the respective working chamber should carry out an active cycle in which the working chamber makes a net displacement of working fluid or an inactive cycle in which the working chamber makes no net displacement of working fluid and to transmit command signals to the electronic actuator controllers, wherein the actuator controllers receive the command signals and control the respective valve actuators responsive thereto to thereby determine the net displacement of working fluid by the working chambers.

2. The fluid working machine according to claim 1, wherein the actuator controller of the valve unit of at least one of the working chambers is configured to determine a valve actuator control sequence from the commands.

3. The fluid working machine according to claim 1, wherein the actuator controller of the valve unit of at least one of the working chambers is configured to receive data specifying one or more of the timing, duration or amplitude of active control of the corresponding valve actuator from one or more of the received commands.

4. The fluid working machine according to claim 3, wherein the valve actuator of the valve unit of at least one of the working chambers is a solenoid and determining the timing of changes to the control of the corresponding valve actuator comprises changing a current through or a voltage across the solenoid at specific times.

5. The fluid working machine according to claim 1, wherein the actuator controller of the valve unit of at least one of the working chambers is configured to start a valve actuator control sequence responsive to one or more of the received commands.

6. The fluid working machine according to claim 1, wherein the actuator controller of the valve unit of at least one of the working chambers comprises a memory storing one or more sequences of changes to the control of the corresponding valve actuator, the actuator controller of the valve unit of the at least one of the working chambers being configured to select one of valve opening and/or closing sequences from the memory responsive to the received commands.

7. The fluid working machine according to claim 1, wherein the commands include a phase or frequency signal and wherein the actuator controller of the valve unit of at least one of the working chambers takes into account the phase or frequency signal when determining the timing of changes to the control of the corresponding valve actuator.

8. The fluid working machine according to claim 1, wherein the valve unit of at least one of the working chambers further comprises a power line configured or configurable to deliver electrical power to the corresponding valve from a power supply, and wherein the actuator controller of the valve unit of the at least one of the working chambers is configured to receive the commands from an external controller through the power line.

9. The fluid working machine according to claim 1, wherein the valve unit of at least one of the working chambers further comprises one or more sensors, and wherein the actuator controller of the valve unit of the at least one of the working chambers is configured to receive sensor measurements from the one or more sensors and to determine the timing of changes to the control of the corresponding valve actuator taking into account the received sensor measurements.

10. The fluid working machine according to claim 1, wherein the actuator controller of the valve unit of at least one of the working chambers is configured to cause the corresponding valve member to remain in an open position or in a closed position by applying a pulse width modulated signal to the corresponding valve actuator, and optionally to determine a frequency and/or mark to space ratio of the pulse width modulated signal.

11. The fluid working machine according to claim 1, wherein the actuator controller of the valve unit of at least one of the working chambers further comprises a closed electrical current control loop configured to maintain a consistent actuating force to the corresponding valve actuator.

12. The fluid working machine according to claim 1, wherein the valve unit of at least one of the working chambers further comprises a stored identifier of the corresponding valve or is configured to generate or receive and then to store an identifier of the corresponding valve, and wherein the actuator controller of the valve unit of the at least one of the working chambers is configured to receive commands comprising identifiers and to process the commands if the received commands comprise the stored identifier of the corresponding valve.

13. The fluid working machine according to claim 1, wherein the actuator controller of the valve unit of at least one of the working chambers is configured to, in response to a command signal being indicative, pause for a period of time before carrying out a sequence of changes to the actuation of the corresponding valve actuator.

14. The fluid working machine according to claim 1, wherein the actuator controller of the valve unit of at least one of the working chambers is configured to transmit data to the machine controller.

15. The fluid working machine according to claim 1, wherein the valve unit of at least one of the working chambers further comprises a further valve having a further valve member, and a further valve actuator coupled to the further valve member, wherein the electronic actuator controller of the valve unit of the at least one of the working chambers is also configured to actively control the further valve actuator to thereby control the further valve member, and wherein in the valve unit of the at least one of the working chambers, the valve member and the further valve member are configured to regulate the flow of hydraulic working fluid into or out of the same working chamber of the fluid working machine.

16. The fluid working machine according to claim 1, wherein the machine controller and the actuator controller of the valve unit of at least one of the working chambers comprise synchronised clocks, and the machine controller is configured to transmit the time at which an event should occur to the actuator controller of the valve unit of the at least one of the working chambers.

17. The fluid working machine according to claim 1, configured such that the valve units transmit data to the machine controller, or wherein the machine controller is configured to transmit to the valve units identifiers of valve units which individual commands concern.

18. The fluid working machine according to claim 1, wherein the machine controller is configured to command one or more valve units to cause their respective working chamber to undergo an active cycle, wherein the fluid working machine further comprises means to determine which working chamber carries out an active cycle as a result and thereby determine which working chamber a valve unit is associated with.

19. A method of operating the fluid working machine according to claim 1, comprising the actuator controller of the valve unit of at least one of the working chambers receiving a command and, responsive thereto, to carrying out one or more changes to the control of the corresponding valve actuator.

\* \* \* \* \*